(12) United States Patent
Kutter et al.

(10) Patent No.: US 8,393,582 B1
(45) Date of Patent: Mar. 12, 2013

(54) APPARATUS AND METHOD OF TRANSFERRING AND UTILIZING RESIDUAL FUEL OF A LAUNCH VEHICLE UPPER STAGE

(75) Inventors: Bernard Friedrich Kutter, Golden, CO (US); Jonathan D. Barr, Highlands Ranch, CO (US); Mari E. Gravlee, Centennial, CO (US); Gerard P. Szatkowski, Morrison, CO (US); Frank C. Zegler, Idledale, CO (US)

(73) Assignee: United Launch Alliance, L.L.C., Centennial, CO (US)

( * ) Notice: Subject to any disclaimer, the term of this patent is extended or adjusted under 35 U.S.C. 154(b) by 260 days.

(21) Appl. No.: 12/903,119

(22) Filed: Oct. 12, 2010

(51) Int. Cl.
*B64G 1/42* (2006.01)

(52) U.S. Cl. ........... 244/172.3; 244/172.2; 244/172.5

(58) Field of Classification Search .......... 244/171.1, 244/172.2–172.5
See application file for complete search history.

(56) References Cited

U.S. PATENT DOCUMENTS

| | | | |
|---|---|---|---|
| 3,907,225 | A | 9/1975 | Welther |
| 4,664,343 | A | 5/1987 | Lofts et al. |
| 5,203,884 | A | 4/1993 | Buchanan et al. |
| 5,862,670 | A | 1/1999 | Lak |
| 6,945,500 | B2 | 9/2005 | Wingo |
| 7,036,773 | B2 | 5/2006 | Caldwell |
| 7,093,337 | B1 | 8/2006 | Taylor |
| 2003/0029969 | A1 | 2/2003 | Turner |
| 2003/0093987 | A1 | 5/2003 | Taylor |
| 2008/0149776 | A1 | 6/2008 | Benedict |

OTHER PUBLICATIONS

Sakla et al. "Centaur Test Bed (CTB) for Cryogenic Fluid Management," Lockheed Martin Space Systems Company, Sep. 2006, 11 pages.
Szatkowski "EELV Secondary Payload Accommodations," United Launch Alliance, Apr. 10, 2008, 11 pages.
Chavez et al. "Operational Satellite Concepts for ESPA Rideshare," 2007 IEEE Aerospace Conference, Mar. 2007, 7 pages.
Day "LCROSS Lunar Crater Observation and Sensing Satellite," NASA, Sep. 2006, 3 pages.
"Orbital Express Mission Book," Boeing, Mar. 2007, 26 pages.
Chato "Experimentation for the Maturation of Deep Space Cryogenic Refueling Technologies," NASA, Jun. 2008, 96 pages.
Churchill "Dark Week in Space," dailywireless.org, Jan. 30, 2007.
Chato "Low Gravity Issues of Deep Space Refueling," NASA, Jul. 2005, 15 pages.
Nakamura et al. "Solar Thermal Propulsion for Small Spacecraft—Engineering System Development and Evaluation," Physical Sciences Inc., Jul. 2005, 9 pages.
Henshall et al. "Solar Thermal Propulsion Augmented with Fiber Optics:—A System Design Proposal," American Institute of Aeronautics and Astronautics, Inc., Jul. 2005, 1 page.
Kennedy et al. "Preliminary Design of a Micro-Scale Solar Thermal Propulsion System," American Institute of Aeronautics and Astronautics, Jul. 2002, 1 page.
Shoji et al. "Solar Thermal Propulsion for Orbit Transfer," AIAA Paper No. 88/3171, Presented at the 24th. Joint Propulsion Conference, Jul. 1988, 1 page.
"Superfluid Helium On-Orbit Transfer Flight Demonstration," NASA, printed Aug. 26, 2008, http://www.lerc.nasa.gov/WWW/MMAP/PIMS/HTMLS/MSRs/STS-57/STS-57.html, 1 page.
Warwick "DARPA Picks Contractors for Fast-Roaming Satellite," Aerospace Daily & Defense Report, Jul. 31, 2008, 1 page.

*Primary Examiner* — Timothy D Collins
*Assistant Examiner* — Nicholas McFall
(74) *Attorney, Agent, or Firm* — Sheridan Ross P.C.

(57) ABSTRACT

A launch system is provided which includes a secondary payload. The secondary payload includes a propellant tank and at least one module that is supported by an adapter ring that is commonly used to secure an upper stage to a primary payload. The propellant tank is launched empty and subsequently filled with residual propellant from the upper stage.

11 Claims, 7 Drawing Sheets

*Fig. 3A*
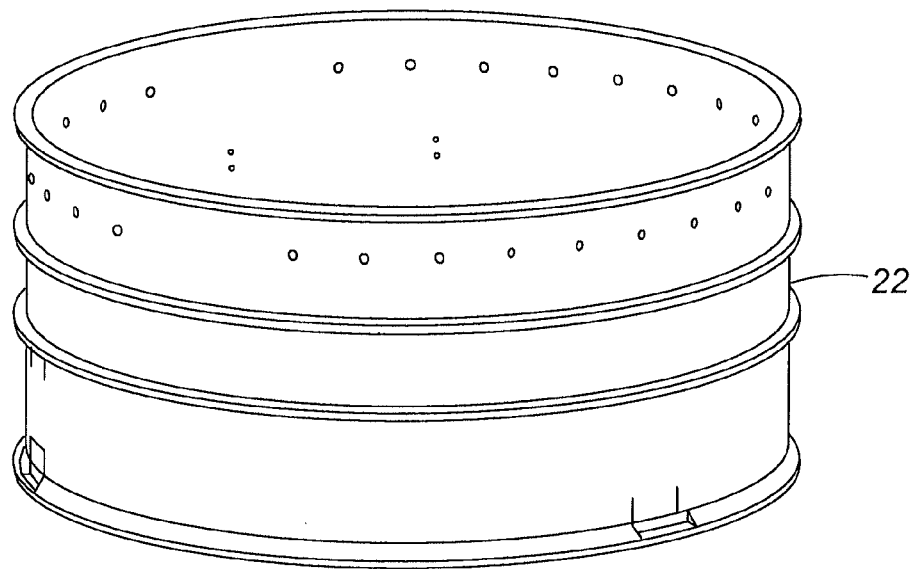
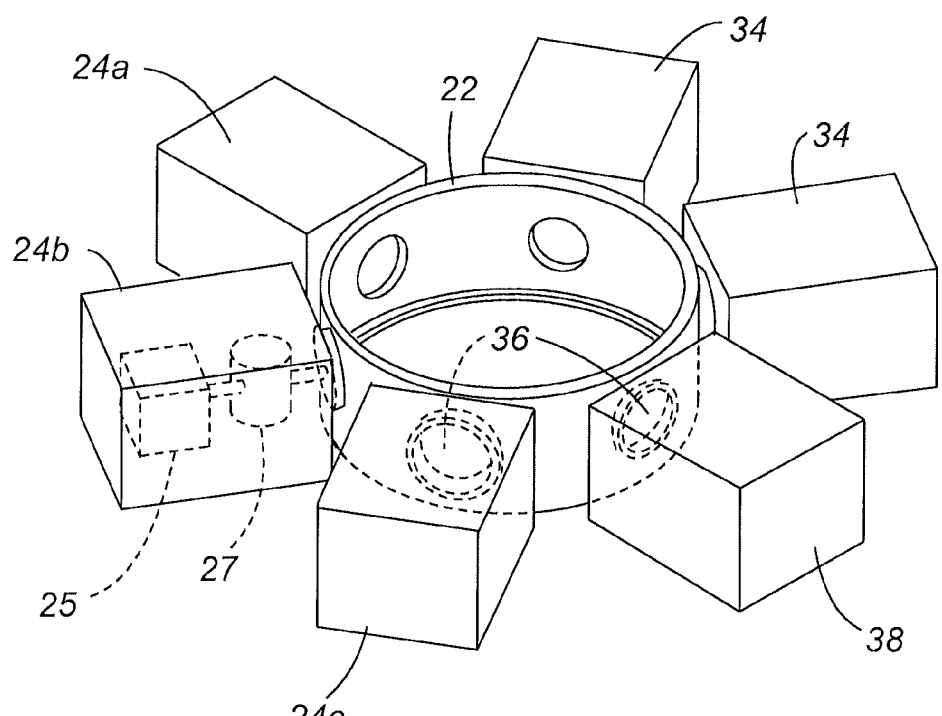
*Fig. 3B*

APPARATUS AND METHOD OF TRANSFERRING AND UTILIZING RESIDUAL FUEL OF A LAUNCH VEHICLE UPPER STAGE

FIELD OF THE INVENTION

The present invention is generally related to launch vehicles having a residual propellant transfer system for use with one or more payloads. More specifically, in one embodiment of the present invention, after the launch vehicle is positioned in space, propellant from an upper stage of the launch vehicle is scavenged and transferred to a payload propellant storage tank associated with one or more propulsion modules and/or payloads.

BACKGROUND OF THE INVENTION

Generally, launch vehicles are comprised of a booster stage that provides the initial boost towards orbit. In addition, an upper stage is often employed to carry a payload to a further desired orbit or to achieve escape velocity. Commonly, upper stages are powered by rocket motors that are fed by cryogenic fuels and oxidizers, such as liquid hydrogen ($LH_2$) and liquid oxygen ($LO_2$). Alternatively, other propellants known to those of skill in the art, such as hydrazine ($N_2H_4$), may be used. After orbit insertion or a desired escape velocity is achieved, the payload is separated from the upper stage by way of methods which are well known by those of skill in the art. The payload may have its own propulsion system or propulsion module to control its position and altitude. An example of a booster stage and upper stage combination is the Atlas V launch vehicle and the Centaur upper stage manufactured by either the United Launch Alliance (ULA), the assignee of the instant application, or the Lockheed Martin Corporation. One skilled in the art will appreciate that other launch vehicles employ upper stages, such as the Delta II and the Delta IV launch systems manufactured by either the ULA or the Boeing Corporation.

The upper stage is generally provided with a quantity of propellant which is greater than what is required to perform a mission. The additional propellant is used to help stabilize the upper stage propellant tanks and provide propellant to accommodate unforeseen mission deviations. After the payload has achieved orbit and separated from the upper stage, normally all residual propellant is expelled in a process called "blow down" to "safe the stage." Blow down refers to venting upper stage residual propellant material, possibly through the upper stage rocket motor. Safing the stage refers to minimizing the potential of future risk of the stage coming apart and causing additional space debris.

It will be apparent to those of skill in the art that in order to provide sufficient propellant for deep space exploration or to allow heavy payloads to be delivered to higher energy orbits than their launch vehicles would otherwise permit, it may be highly advantageous to undergo refueling in space. For example, space exploration and colonization visionaries foresee the use of orbiting depots that are used to fuel or refuel upper stages and/or payloads (some payloads are capable of independent propulsion and therefore have independent propellant requirements). The ability to fuel a rocket or engine in orbit has the advantage of decreasing the launch weight of launch vehicles, thereby increasing performance of those launch vehicles, increasing safety and decreasing costs associated with the launch. The Orbital Express space mission is one example of a system that is designed to refuel/service a payload in space. The Orbital Express mission generally comprised two spacecraft, an Autonomous Space Transport Robotic Orbiter (ASTRO), and a next generation satellite. ASTRO established the technical feasibility of an autonomous on-orbit refueling and reconfiguration of the next generation satellite. Furthermore, U.S. Pat. No. 5,862,670 to Lak, the entire disclosure of which is incorporated by reference herein, describes a system wherein upper stage propellant is stored in the cargo bay of the space shuttle, launched into space by a booster stage, and is used to fuel the space shuttle or other payloads to reduce ground handling of the volatile cryogenic upper stage propellants.

It has been long appreciated that certain portions of a launch vehicle are not effectively used. One example of efforts to utilize available space is the Ariane Structure for Auxiliary Payloads (ASAP) launch vehicle. ASAP is positioned in the upper stage of the launch vehicle and may carry multiple payloads. The upper stage or primary payload delivery system positions the primary payload for deployment. Once the primary payload is deployed, the ASAP launcher deploys the one or more secondary payloads and maneuvers between deployment as is needed using its own propulsion system or propulsion module. Another example of increased utilization of space is a payload adapter ring (or "adapter") interconnected to the upper stage and designed for supporting a payload. The space internal to the ring and between the ring and a payload fairing of the upper stage has been used to accommodate additional payloads, i.e., "secondary payloads." One example of such a ring is the Evolved Expendable Launch Vehicle (EELV) Secondary Payload Adaptor (ESPA). Secondary payloads are generally separated from the adapter ring subsequent to primary payload separation. Secondary payloads may be designed to be used for a limited time until their orbits decay and they are destroyed during re-entry or may be designed for a more extended lifetime. Further, as previously noted, some secondary payloads are capable of independent propulsion and include propulsion systems, such as thrusters and control modules, that allow the secondary payload to maintain a desired orbit or to achieve escape velocity. None of the launch systems currently in existence or otherwise known to those of skill in the art, however, disclose a method of filling a propellant tank associated with a payload delivery system or a payload propulsion system subsequent to launch and in space.

NASA's Lunar Crater Observation and Sensing Satellite (LCROSS) includes a propellant tank that is situated inside a payload adapter ring that is positioned between the upper stage and the primary payload. The payload adapter ring also provides mounting positions for avionics and hydrazine thrusters. However, the propellant tank is filled with hydrazine prior to launch. After separation from the booster stage, the upper stage launches the primary payload (LRO) and the secondary payload (LCROSS) on a trajectory towards the moon. Thereafter, the secondary payload, which includes the payload adapter ring, a secondary payload delivery system comprising a propellant tank, avionics and propulsion module, and perhaps one or more other modules containing test or experimental apparatus, is separated from the upper stage. The upper stage then impacts the lunar surface forcing lunar dust into space that is collected and analyzed by one or more of the other modules of the LCROSS. Importantly, the propulsion system of the LCROSS does not utilize propellant residuals of the upper stage.

Thus, there is a long felt and unresolved need to utilize the residual upper stage propellant to fuel a payload delivery system which includes one or more payload propulsion systems. For convenience purposes, such an on-orbit payload delivery system is called OPADS (Orbital Payload Delivery System). The concept embodies the transfer and use of any upper stage propellant (e.g., LH2, LO2, RP1, MMH, NTO, etc) and is not limited to any single propellant such as LH2. The following disclosure describes some, but not all, embodiments of the OPADS wherein residual propellant from the upper stage is transferred to a propellant tank that is launched empty and is used by one or more payloads and/or payload propulsion modules.

SUMMARY OF THE INVENTION

It is one aspect of the present invention to provide a system for transferring residual propellant material from an upper stage of a launch vehicle to a payload propellant storage tank associated with one or more payloads and/or payload delivery systems. A typical upper stage is the Centaur upper stage that mixes and combusts liquid hydrogen ($LH_2$) and liquid oxygen ($LO_2$) to provide thrust. The Centaur is generally used on the Atlas family of launch vehicles (Atlas Centaur), but can be used on other vehicles as well, such as the Titan launch vehicle (Titan Centaur) and Space Shuttle. Other launch systems, such as the Delta or Arianne, generally employ upper stages as well. The embodiments discussed herein can be modified to be used in association with any upper stage or any launch vehicle system that utilizes liquid propellant. Similarly, embodiments of the present invention may be adapted for use with any liquid propellant, not just liquid hydrogen and oxygen.

With respect to the Atlas V launch vehicle, a payload adaptor ring is commonly positioned between the upper stage and a payload. The payload adapter is normally a cylinder or ring and, in one embodiment, is a minimum of thirteen inches (13") high, but can be much taller, has a diameter of about sixty inches (60"), and includes a plurality of locations for interconnection of secondary or auxiliary payloads. Those of skill in the art will recognize that the payload adapter may comprise other shapes as well. The internal volume of the adapter ring is generally empty and the space may be utilized for additional objectives, including additional payloads and/or payload propellant tanks. For example, the LCROSS project previously discussed positions a tank for holding hydrazine in the space. One embodiment of the present invention includes a payload propellant storage tank situated within the internal space of the payload adapter ring for receiving residual propellant from the upper stage with the transfer occurring in space rather than filling the payload propellant storage tank on the ground. Prior to the present invention, upper stage residual propellant is vented overboard and wasted once the upper stage has completed its mission. According to one aspect of the present invention, the upper stage residual propellant may be scavenged and effectively used by a payload propulsion system to place a payload in the required orbit, to provide propulsion and motion control for a jettisoned payload, or for other purposes such as cooling for instruments associated with a scientific or military mission. The terms payload propulsion system or payload delivery system as used herein are synonymous. These systems may take form as an upper stage delivery system, first or primary payload delivery system and/or second, secondary or auxiliary payload system. The terms primary and secondary are not intended to connote importance or priority, but are used to distinguish one payload from another. The terms auxiliary payload and secondary payload are synonymous.

It is another aspect of the present invention to provide storage tank for liquid propellants that does not require great amounts of power to maintain. For example, liquid hydrogen is a cryogenic fluid that must be maintained with specific pressure and temperature. If the fluid temperature in the storage tank is increased, the liquid hydrogen will change phase into gaseous hydrogen that will need to be vented to prevent tank over pressurization. The phase of the stored propellant is important since the various payload propulsion systems contemplated by embodiments of the present invention, at least initially, requires storage of liquid instead of gas to enable large quantities of propellant to be stored in a reasonable volume. To help control and maintain the temperature of the payload propellant storage tank for the full duration of the mission, whether that is hours or months long, embodiments of the present invention employ a plurality of multilayer insulations, such as heat reflective blankets, that help block radiant heat which is the primary or dominant source of heat in space. A vent system may also be employed that enables cooling of the stored propellant by venting the propellant, taking advantage of the Joule-Thompson effect. The Joule-Thompson effect describes the temperature change of a gas or liquid when the fluid flows through an orifice while ensuring no heat is exchanged between the fluid and the environment (i.e., adiabatic process). The vent system may comprise a thermodynamic system or any other type of system known to those of skill in the art which enables cooling of the propellant. In addition, embodiments of the present invention employ a plurality of thermally low-conductive struts or supports that interconnect the payload propellant storage tank to the payload support structure to minimize conductive heat gain. Alternative techniques include use of a vapor-cooled shield, a sun shield, and vapor-cooled struts.

It is another aspect of the present invention to provide a payload propulsion system with high specific impulse (ISP). Specific impulse generally refers to the change in momentum per unit of propellant and measures the efficiency of an engine. The higher the specific impulse, the less propellant is needed to achieve a desired momentum change. For example, the ISP for a turbo jet is about 3,000 seconds, an ion thruster is about 3,000 seconds, a LO2-RP1 bi-propellant liquid rocket engine is about 338 seconds when operating in a vacuum, the space shuttle main engines are about 454 seconds, and a solid rocket engine is about 267 seconds. ISP will vary depending upon the propellant and the type of power module used to heat the propellant. Embodiments of the present invention may employ any variety of payload propulsion systems for one or more of the payload delivery systems, including but not limited to solar thermal, regenerative solar where energy may be produced and stored, such as in a battery, nuclear thermal, and liquid hydrogen/oxygen combustion, arc jet, resisto jet or a combination thereof, or any other known propulsion systems. A solar thermal propulsion system achieves an ISP of about 800 seconds using hydrogen. Solar thermal propulsion systems use solar energy to heat propellant that is then fed through a nozzle to generate thrust. One skilled in the art will appreciate that hydrogen is an excellent propellant due to its low molecular weight, thus high ISP. Conversely, an upper stage engine using hydrazine can only achieve an ISP of about 230 seconds. Hydrogen thus has benefits over the use of hydrazine over and above the inherent dangers of handling of carcinogenic hydrazine. The propulsion system must be capable of heating the propellant to a high temperature in order to maximize ISP. What qualifies as high temperature will vary depending upon the propellant, but would generally be in the range of 3,000 to 6,000 degrees K.

It is another aspect of the present invention to provide payloads that do not substantially increase the risk of failure of the launch vehicle. The launch vehicle may include one or more payloads that do not directly utilize liquid hydrogen at lift off, thereby not impacting ground operations. Thus, there is no risk of explosion or human injury generally associated with ground handling and pre-launch storage of separate cryogenic propellants for a payload propulsion system. More specifically, there are distinct disadvantages of filling propellant tanks prior to launch. The foremost is the hazards of handling liquid hydrogen. Hydrogen is an invisible, odorless and flavorless gas that is highly flammable or explosive in the presence of an oxidizer. Liquid hydrogen can also cause asphyxiation and burns. There is also the additional cost of additional fuel lines, valves, venting and monitoring systems that would be needed if payload propellant storage tanks were filled on the ground. Embodiments of the present invention reduce these disadvantages by transferring residual upper stage propellant to a payload propellant storage tank in space for subsequent use by payload propulsion systems. Further, by launching with an empty payload propulsion storage tank, the payloads will be lighter.

Similarly, the scavenged propellant may also be used for cooling purposes with scientific or military payloads to thereby eliminate currently used complex and heavy cooling systems. More particularly, some payloads consist of instrumentation modules, for example, experiments or apparatus that generate significant heat when operating. Cooling systems are required to keep these systems from overheating. The propellant transferred to the payload propellant storage tank can be used for this purpose. Depending upon the nature of the apparatus, the propellant could be circulated and reused or vented to space. In either situation, currently used cooling systems could be drastically reduced or simplified.

It is another aspect of the present invention to provide affordable space access for multiple purposes in addition to the primary purpose of the launch. Eliminating the aforementioned concerns generally decreases the cost of a mission. Adding multiple or additional payloads spreads out the cost of a mission.

It is another aspect of the present invention to allow for launching of covert payloads. For example, one skilled in the art will appreciate that a payload as described herein may be "hidden" within a launch vehicle upper stage which could be useful for non-public purposes such as military or intelligence applications. That is, one skilled in the art will appreciate that launch services may be sold to a commercial customer wherein a second payload is utilized to support a non-public government mission.

Although the preferred embodiment of the present invention contemplates transfer of propellant from the upper stage propellant tanks to payload propellant tanks following completion of the mission of the upper stage, any transfer of propellant between the propellant tanks of the upper stage and/or booster stage or other stages and payload propellant tanks, subsequent, during or prior to upper stage activation is contemplated by embodiments of the present invention. In one embodiment of the present invention, residual propellant will be taken from at least one upper stage propellant tank, for example from an $LH_2$ tank, when the upper stage is in space, and transferred to at least one payload propellant storage tank.

In one embodiment, the payload propellant storage tank is initially purged and filled with gaseous helium prior to launch to ensure its cleanliness. At the time the payload propellant storage tank is to be filled, a vent line associated with the payload propellant storage tank is opened which allows the helium to vent and gaseous/liquid hydrogen from the upper stage propellant tank to flow into the payload propellant storage tank. The transfer of gaseous/liquid hydrogen to the payload propellant storage tank acts to chill the payload propellant storage tank. The simultaneous venting of helium and some hydrogen from the upper stage propellant tank also changes the momentum of the upper stage and payload delivery system. The change in momentum causes $LH_2$ in the upper stage tank to slosh to the opposite end of the tank, further causing the $LH_2$ to surround the exit valve for the fill line and any gaseous hydrogen ($GH_2$) to move to the opposite end of the upper stage propellant tank away from the exit valve. In turn, this causes the $LH_2$ to fill the fill line and the payload propellant storage tank.

The Summary of the Invention is neither intended nor should it be construed as being representative of the full extent and scope of the present invention. Moreover, reference made herein to "the present invention" or aspects thereof should be understood to mean certain embodiments of the present invention and should not necessarily be construed as limiting all embodiments to a particular description. The present invention is set forth in various levels of detail in the Summary of the Invention as well as in the attached drawings and the Detailed Description of the Invention and no limitation as to the scope of the present invention is intended by either the inclusion or non-inclusion of elements, components, etc. in this Summary of the Invention.

BRIEF DESCRIPTION OF THE DRAWINGS

The accompanying drawings, which are incorporated in and constitute a part of the specification, illustrate embodiments of the invention and together with the general description of the invention given above and the detailed description of the drawings given below, serve to explain the principles of these inventions.

FIG. 3A is a schematic view of one embodiment of a payload adapter ring;

FIG. 3B is a perspective view of payload adapter ring with associated modules attached thereto;

It should be understood that the drawings are not necessarily to scale. In certain instances, details that are not necessary for an understanding of the invention or that render other details difficult to perceive may have been omitted. It should be understood, of course, that the invention is not necessarily limited to the particular embodiments illustrated herein.

DETAILED DESCRIPTION

Figure 1:
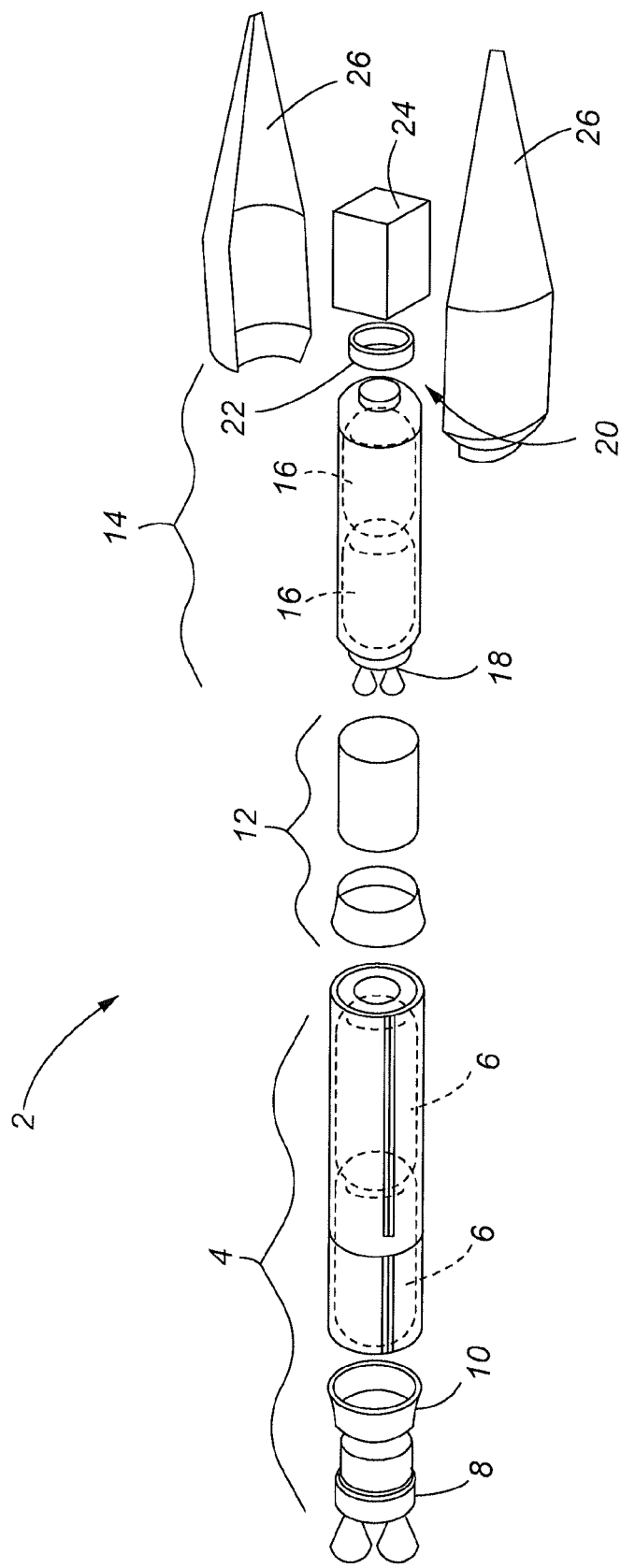
FIG. 1 is an expanded perspective view of a launch system commonly employed to place a payload into a predetermined orbit.

With reference to FIG. 1, one embodiment of a launch vehicle 2 is shown. The launch vehicle 2 comprises a booster stage 4 containing one or more propellant tanks 6, a booster engine 8 positioned in an engine skirt 10, an interstage member 12 that interconnects the booster stage 4 to an upper stage 14 containing upper stage propellant tanks 16 and an upper stage engine 18, topped off with a payload fairing 26. Inside the payload fairing is the orbital payload delivery system (OPADS) 20 including a payload adapter ring 22 interconnecting the upper stage 14 to one or more payloads 24.

In operation the booster engine 8 is initially ignited, whereby propellant from the booster tanks 6 is fed to the booster engine 8. The reactive force associated with this combustion will lift the upper stage 14, OPADS 20 and payloads 24 part way to orbit. Once all of the useable propellant from the booster stage propellant tanks 6 is expended, the booster stage 4 is shut down and is separated from the upper stage 14. When sufficiently clear of atmosphere, the payload fairing 26 is jettisoned. The upper stage engine 18 is ignited and then propels itself and the interconnected OPADS 20 to orbit. In some instances, the upper stage 14 is designed to provide enough velocity such that OPADS 20 and the payload 24 escape Earth's gravitational pull. Once OPADS 20 is placed in the intended orbit, the upper stage engine 18 is shut down and one or possibly more payloads 24 are separated from OPADS 20. The payloads may be deployed sequentially in the same orbit (for example, multiple satellites) or, if any payload includes an independent payload propulsion system, that payload may be simultaneously or sequentially deployed and repositioned to a different orbit or propelled to an escape velocity to escape the Earth's gravitation by the payload propulsion system (for example, to deliver the payload for lunar capture or for deep space missions). Optionally, if more than one payload 24 is present, after the first payload is separated, the upper stage engines 18 could refire and ferry OPADS 20 and the remaining payload(s) to a different orbit. The upper stage 14 may remain in orbit, which could decay over time, thereby facilitating its destruction during re-entry. Following separation of OPADS and the last payload, the upper stage 14 vents the unneeded remaining liquid propellant and residual gases to safe the stage prior to end of mission.

Figure 2:
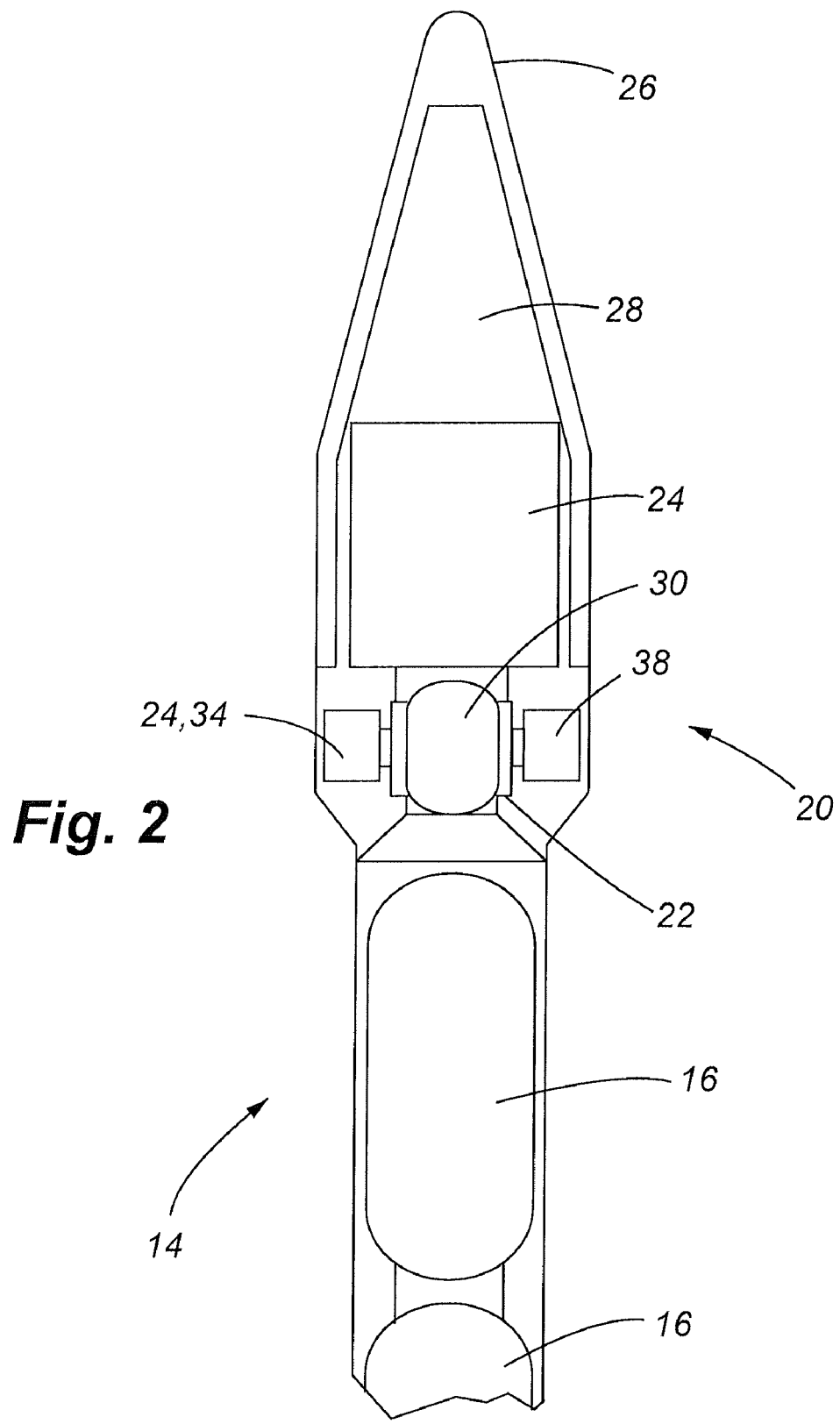
FIG. 2 is a cross-sectional view of a payload fairing and associated payload adapter ring for interconnecting a payload to an upper stage.

Referring now to FIG. 2, a common configuration of payload fairing 26 and upper stage 14 is shown. Here, the payload fairing 26 defines a space or payload envelope 28 that is reserved for payloads 24 and OPADS 20. As illustrated, OPADS 20 comprises a payload adapter ring 22, and one or more propellant tanks 30 possibly positioned in the interior space of the adapter ring 22 and an avionics/propulsion module 38. Attached to OPADS 20 are one or more payloads. These payloads include separable payloads 24 that at appropriate times separate from OPADS 20 as well as fixed payloads 34 that remain attached to OPADS benefiting from OPADS' capabilities. OPADS may comprise other combinations of these or other components provided there is at least one payload, a propellant storage tank to receive residual propellant and a propulsion system to position the payload(s) as desired.

Figure 3C:
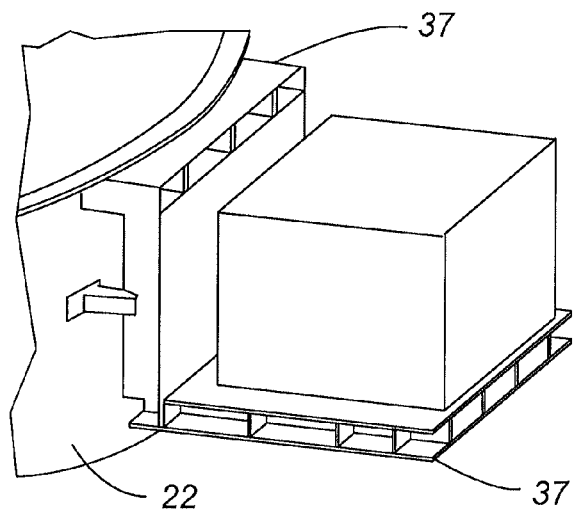
FIG. 3C is a perspective view of a payload mounted to an adapter ring.

Referring to FIG. 3A, the payload adapter ring 22 may comprise a C adapter, ESPA, separation systems, other adapters or a combination of adapters. FIG. 3A depicts a C adapter while FIG. 3B shows an Evolved Expendable Launch Vehicle (EELV) Secondary Payload Adaptor (ESPA). Both the C-adapter and the ESPA ring are about 60 inches in diameter with common interfaces. While the ESPA ring is 24 inches high, the C-adapters come in a plurality of heights. The ESPA ring is adapted to secure as many as 6 modules around its outer perimeter at defined stations 36 as illustrated in FIGS. 2 and 3B. Similarly, as shown in FIG. 3C, it is possible to attach a plurality of modules to the C-adapter using the C-adapter Utility Platform (CUP) 37. In one embodiment, the adapter ring 22 employs 4-6 stations for connecting modules. Each module may comprise an individual or discrete separating payload 24a, 24b and 24c, or a payload 34 that will remain attached to OPADS as well as one or more OPADS modules 38 supporting avionics modules, data modules, propulsion or control modules, and mission specific modules. For such attached payloads OPADS may also provide station keeping, power and communication utility services.

In accordance with the present invention, prior to separation of the OPADS 20, from the upper stage 14, residual propellant from the upper stage propellant tanks 16 may be transferred to the OPADS propellant tanks 30. Rather than using the upper stage engine 18 to ferry payloads 24 and/or 34 to their intended orbit, OPADS 20 may separate from the upper stage 14 and an OPADS' propulsion module 38 may be employed to propel and control movement using the residual propellant transferred from the upper stage as reaction mass. Once OPADS achieves the desired orbit individual payloads 24a, 24b and 24c are separated. Furthermore, as shown in FIG. 3B, individual payloads 24a, 24b and 24c may incorporate their own dedicated propulsion modules 25. In this case, propellant from OPADS' propellant storage tank 30 maybe be transferred to a storage tank 27 associated with the propulsion module of each individual payload, such as 24b, prior to the individual payload being separated from OPADS 20. The payload 24b is then capable of individualized positioning and control.

Figure 4:
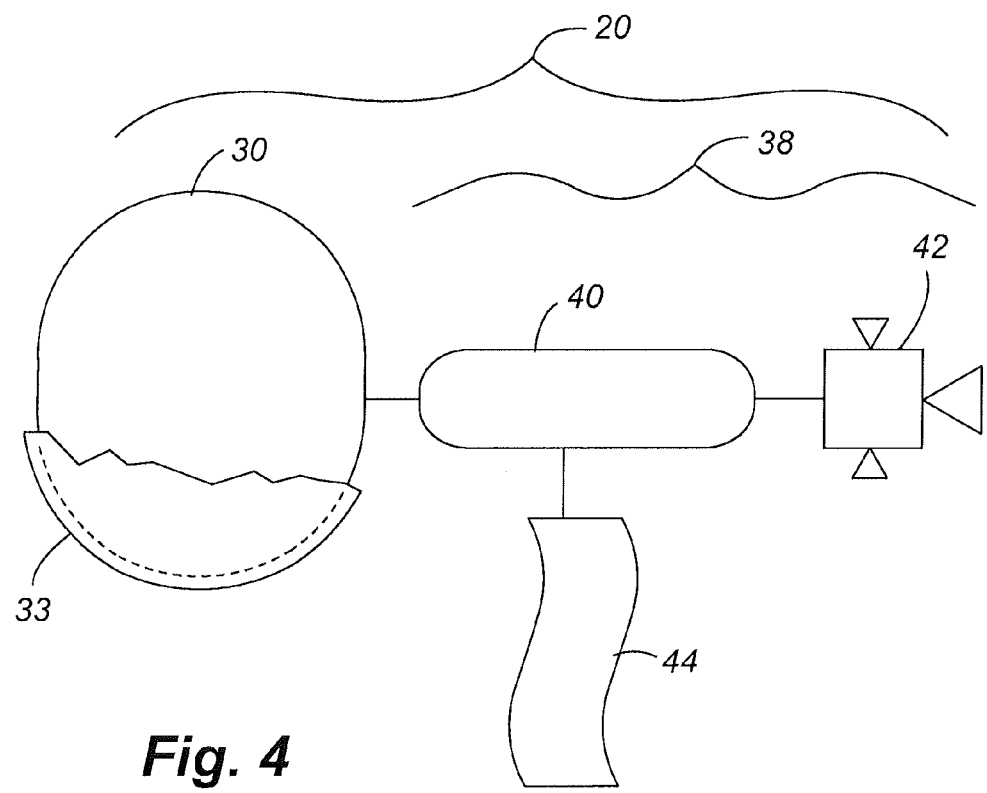
FIG. 4 is a schematic of one embodiment of a propulsion system or propulsion module.

Referring now to FIG. 4, a schematic of one embodiment of OPADS and a propulsion module 38 is shown. In this example, the payload propellant tank 30 provides propellant, possibly $H_2$, to an energy storage module 40 which is in communication with the thruster assembly 42 and a solar array 44. The hydrogen is stored within OPADS' 20 propellant tank 30 as a liquid. The hydrogen is extracted from the tank in either gaseous or liquid form and delivered to the energy storage module 40. The associated solar array 44 heats the energy storage module to high temperature. As the hydrogen is fed through the energy storage module it is heated to a high temperature, and is then directed to the thruster assembly 42 to provide high ISP thrust for maneuvering or station keeping. One skilled in the art will appreciate that other types or varieties of propulsion modules may be used instead, for example, solar thermal, nuclear thermal, arc jet, resisto jet, bipropellant combustion or any other capable propulsion system may be employed to provide the required thrust. Similarly a multitude of fluids are used in current upper stages and could be transferred to OPADS including, for example, LH2, LO2, LCH4, N2H4 MMH, RP, NTO and helium.

If the transferred propellant is a cryogen, such as LH2 or LO2, OPADS must incorporate thermal features enabling long duration storage of said cryogenic propellant in the tank 30. In order to minimize heat transfer from the OPADS structure 22 to the cryogenic propellant the propellant tank 30 is supported by a plurality of thermally low-conductive struts (not shown) and employs a plurality of insulative blankets 33 (illustrated in FIG. 4) wrapped around the tank itself to limit radiant heating associated with solar exposure or the warm OPADS structure. Additional thermal management features such as thermodynamic venting, vapor cooling and sun shields may be employed.

The process of transferring residual propellant from the upper stage propellant tank 16 to OPADS' propellant tank 30 will now be described. The following discussion assumes transfer of LH2, but is representative of the transfer process for other propellants. Prior to transferring $LH_2$ to the propellant storage tank 30 of OPADS 20, the upper stage 18 is oriented in a favorable attitude to support $LH_2$ transfer, i.e., the upper stage 18 may be placed in a sun normal position. A slow roll, for example, one degree per second, may also be initiated to ensure uniform system heating from solar radiation. Utilizing the upper stage settling motors, the upper stage and OPADS are slowly accelerated forward to settle the residual liquids aft.

Figure 5:
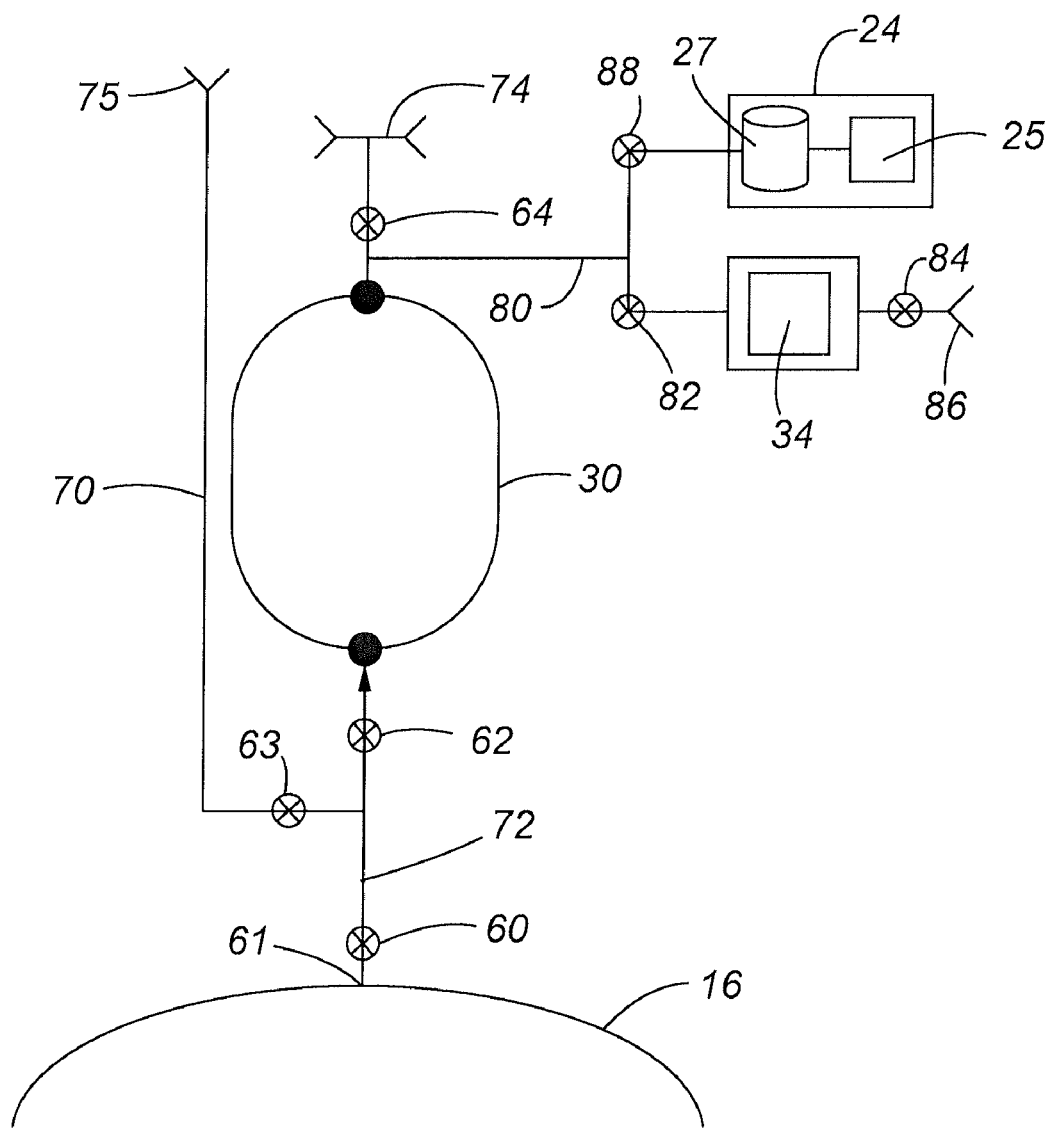
FIG. 5 is a schematic view of one embodiment of a propellant transfer system.
Figure 6:
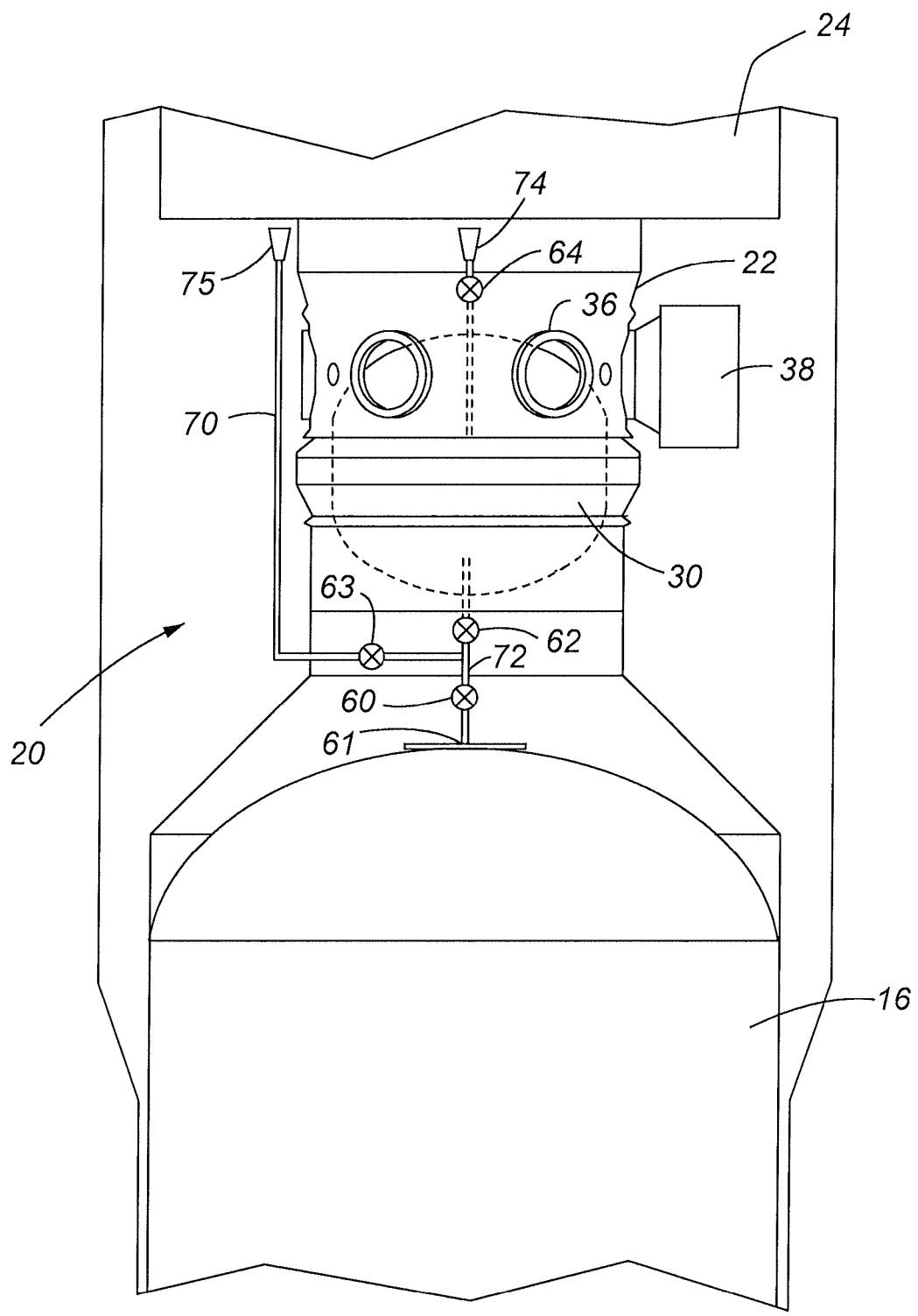
FIG. 6 is a plan view of one embodiment of a payload delivery system of the present invention.

With reference to FIGS. 5 and 6, to enable fluid transfer from the upper stage to OPADS valve 60 is commanded open enabling H2 to enter the transfer line 72. Valves 62 and 64 are opened enabling cold GH2 to flow through the transfer line 72 and OPADS' propellant tank 30 before being vented to space through the non-propulsive nozzle 74. This initiates the OPADS chill down while simultaneously dropping the upper stage tank pressure.

Following this initial chill down, the upper stage settling is terminated and valve 63 is opened, venting GH2 through the tank bypass line 70 and through the forward propulsive nozzle 75. This provides a forward thrust vector that reverse settles (backward acceleration) the upper stage and OPADS. This reverse settling causes the upper stage liquids to settle to the front of the propellant tanks 16. Once LH2 covers the upper stage forward fluid transfer port 61 LH2 starts flowing into the transfer line 72. A period of liquid flow (possibly intermixed with non-flow periods, pulse chill down, controlled by valves 62 and 64) fully chills the OPADS, as monitored by a sensing system, establishing the proper cold conditions for loading OPADS' propellant tank 30 with LH2. While reverse settling continues LH2 flows from the upper stage into OPADS' propellant tank through valves 60 and 62. This transfer can be pressure or pump driven. Effective OPADS chill down may enable zero-vent fill of the OPADS tank. Alternatively, the OPADS tank can be vented by keeping valve 64 open.

Once the OPADS tank is filled, or all of the liquid propellant is drained from the upper stage valves 60, 62, 63 and 64 are closed. OPADS separation is than commanded enabling OPADS and the attached payloads to fly free of the upper stage and continue the mission. The upper stage is then safed and disposed of as described earlier.

It should be appreciated that reverse settling and associated sloshing of the upper stage propellant forward is not required. As an alternative, fluid lines and valving may be located at different positions on the upper stage propellant tank in order to access the liquid propellant when settled aft using the upper stage settling motors. Alternatively liquid acquisition devices (LAD) may be employed to enable zero-G liquid transfer.

As a further alternative, propellant from OPADS' propellant storage tank may be used to cool critical payload elements. In particular if OPADS' propellants comprise cryogenic fluids such as LH2 or LO2, OPADS can efficiently satisfy the cooling requirements for payload instrumentation operating as part or all of a scientific module 34 that remains attached to OPADS. One example is illustrated in FIG. 5. Propellant from propellant storage tank 30 is transferred through transfer line 80 through valve 82 to circulate around module 34 containing instrumentation which requires cooling. The propellant may be returned to propellant storage tank 30 or vented through valve 84 and vent 86. Propellant may also be transferred to a storage tank 27 associated with a propulsion module 25 of a separable payload 24 through transfer line 80 by opening valve 88.

Figure 7:
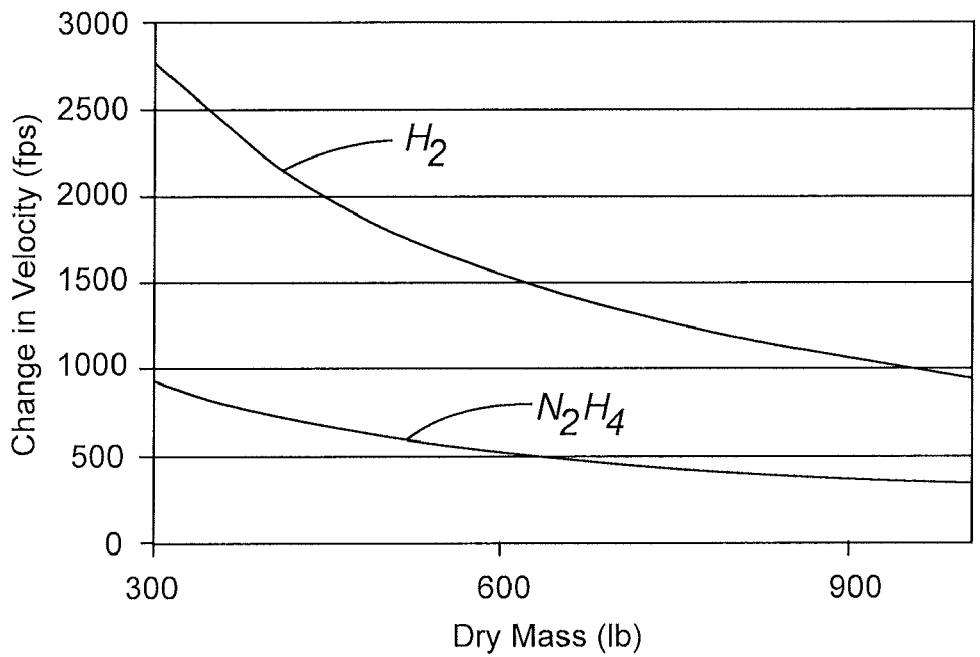
FIG. 7 is a graph showing the amount of velocity change versus system dry mass used by one embodiment of the present invention.

FIG. 7 is a graph of velocity change enabled by OPADS versus dry weight. This graph illustrates that the use of H2 for reaction mass provides higher performance than an equivalent mass of N2H4. The data associated with this graph is based upon 150 pounds of propellant.

Figure 8:
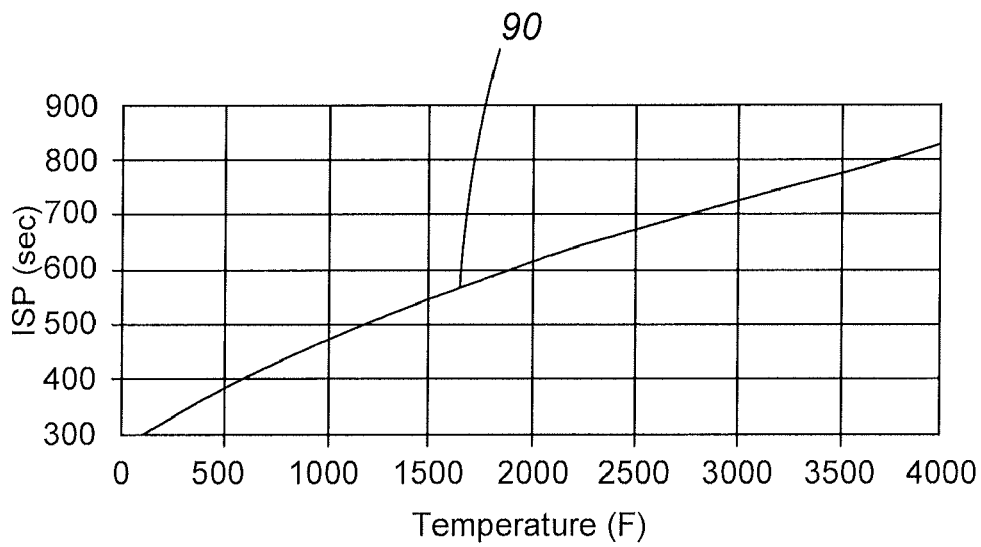
FIG. 8 is a graph showing specific impulse provided by the propulsion system of one embodiment of the present invention versus $GH_2$ temperature.

FIG. 8 is a graph showing ISP versus the temperature of the expelled reaction gas for hydrogen. Here, one can appreciate from line 90 that higher temperatures significantly improve performance. With $H_2$ temperatures of about 3000° F., ISPs in the range of 700-800 seconds can be achieved, nearly double chemical combustion propulsion.

While various embodiments of the present invention have been described in detail, it is apparent that modifications and alterations of those embodiments will occur to those skilled in the art. However, it is to be expressly understood that such modifications and alterations are within the scope and spirit of the present invention, as set forth in the following claims. For example, the upper stage residual propellant transferred to OPADS may be used for primary propulsion, station keeping, payload cooling, on-orbit demonstration of cryogenic-fluid-management devices and techniques and even to support crew life support, orbital manufacturing or in-situ resource utilization.

It should be appreciated that transfer of residual propellant from the upper stage propellant tanks to the OPADS propellant storage tank may take place at other times or in other sequences. As also noted, the present invention may be used with any kind of propellant and the transfer may occur from any tank to any other tank, including from the main booster tanks. Other modifications or uses for the present invention will also occur to those of skill in the art after reading the present disclosure. Such modifications or uses are deemed to be within the scope of the present invention.

What is claimed is:

1. A method of fueling a secondary payload delivery system that is launched into orbit or beyond in association with a primary payload delivery system, comprising:
   a) providing primary payload delivery system comprising a launch vehicle with a booster stage, an upper stage interconnected to the booster stage, the upper stage including a first tank for holding a propellant and a secondary payload delivery system including a second tank for holding the propellant;
   b) providing the first tank with propellant prior to launch and providing the second tank without or substantially without propellant prior to launch;
   c) when the upper stage and secondary payload delivery system are in space, directing flow of the propellant from said first tank to said second tank;
   d) filling said second tank in space with a predetermined amount of propellant;
   e) ceasing the flow of propellant from said first tank to said second tank in space; and
   f) separating said upper stage and said secondary payload delivery system in space.

2. The method of claim 1, further comprising:
   venting a portion of the propellant through an outlet associated with the second tank; and
   directing the vented propellant so as to locate a liquid portion thereof adjacent to a feed line that directs the propellant from said first tank to the second tank.

3. The method of claim 1, wherein the separating occurs after the secondary payload delivery system is used to ferry the upper stage to a predetermined orbit.

4. The method of claim 3, wherein the second tank receives propellant from the first tank subsequent to delivery to said predetermined orbit and prior to the separating.

5. The method of claim 1, wherein the secondary payload delivery system is comprised of the second tank that is positioned with a ring that is associated with the upper stage, the ring including ports for at least one of a propulsion module, a control module and a data module.

6. The method of claim 5, wherein the ring is separable from the upper stage.

7. The method of claim 1, further comprising at least one of transferring the upper stage and the secondary payload delivery system to a second orbit and providing sufficient velocity to the upper stage and secondary payload delivery system to escape a gravitational pull of a body in space.

8. The method of claim 1, further comprising transferring the upper stage and the secondary payload delivery system to a second orbit and separating the secondary payload delivery system from the upper stage.

9. The method of claim 1, further comprising separating the secondary payload delivery system from the upper stage.

10. The method of claim 2, wherein said directing further comprises filling the second tank a predetermined amount.

11. The method of claim 2, wherein said directing further comprises ceasing the flow of propellant into the second tank.

* * * * *